US009428926B2

(12) United States Patent
Kramer

(10) Patent No.: US 9,428,926 B2
(45) Date of Patent: Aug. 30, 2016

(54) PREFABRICATED BUILDING AND KIT

(76) Inventor: Richard H. Kramer, Bowling Green, OH (US)

( * ) Notice: Subject to any disclaimer, the term of this patent is extended or adjusted under 35 U.S.C. 154(b) by 0 days.

(21) Appl. No.: 13/811,292

(22) PCT Filed: Jul. 19, 2011

(86) PCT No.: PCT/US2011/044570
§ 371 (c)(1),
(2), (4) Date: Jan. 21, 2013

(87) PCT Pub. No.: WO2012/012455
PCT Pub. Date: Jan. 26, 2012

(65) Prior Publication Data
US 2013/0118092 A1 May 16, 2013

Related U.S. Application Data

(60) Provisional application No. 61/365,632, filed on Jul. 19, 2010.

(51) Int. Cl.
*E04H 1/00* (2006.01)
*E04D 5/00* (2006.01)
*E04B 1/343* (2006.01)
*E04B 2/08* (2006.01)
(Continued)

(52) U.S. Cl.
CPC .............. *E04H 1/00* (2013.01); *E04B 1/34326* (2013.01); *E04B 2/08* (2013.01); *E04D 5/00* (2013.01); *E04H 1/1205* (2013.01); *E04H 9/14* (2013.01); *E04H 15/644* (2013.01)

(58) Field of Classification Search
CPC .............. E04B 1/02; E04B 1/08; E04B 1/12; E04B 1/18; E04B 1/48; E04B 1/34326; E04B 1/34347; E04B 2/02; E04B 2002/0245; E04B 2/18; E04B 2/08; E04B 2/32; E04B 2/56; E04B 7/00; E04B 1/5831; E04C 1/00; E04C 2/48; E04C 2/02; E04C 1/40; E04H 1/00; E04H 1/1205; E04H 9/14; E04H 15/644; E04D 5/00
USPC ....... 52/23, 79.1, 79.13, 102, 233, 561–563, 52/565, 566, 569, 571, 575, 582.1, 585.1, 52/745.09, 745.1, 747.1
See application file for complete search history.

(56) References Cited

U.S. PATENT DOCUMENTS 2,309,426 A * 1/1943 Williams ................ E04B 2/708
52/233
2,476,229 A * 7/1949 Tobin ............................. 52/569
(Continued)

FOREIGN PATENT DOCUMENTS

FR      WO 2006120353 A2 *  11/2006  ............. B28B 1/525

*Primary Examiner* — Charles A Fox
*Assistant Examiner* — Joseph J Sadlon
(74) *Attorney, Agent, or Firm* — MacMillan, Sobanski & Todd, LLC

(57) ABSTRACT

A prefabricated building includes a sheet folded to form a structural member defining an interior space. The structural member defines an upper guide hole that extends from the interior space of the structural member to the exterior of the structural member, and a lower guide hole that extends from the interior space of the structural member to the exterior of the structural member. The prefabricated building also includes a guide member that is fixed relative to a foundation. The structural member is aligned so that the guide member passes through the upper guide hole and the lower guide hole.

13 Claims, 13 Drawing Sheets

(51) Int. Cl.
  *E04H 1/12* (2006.01)
  *E04H 9/14* (2006.01)
  *E04H 15/64* (2006.01)

(56) References Cited

U.S. PATENT DOCUMENTS

| | | | | |
|---|---|---|---|---|
| 2,883,712 | A | * | 4/1959 | Shelamer, Sr. .................... 52/63 |
| 3,264,021 | A | * | 8/1966 | Artman ........................... 52/578 |
| 3,464,168 | A | * | 9/1969 | Lyons, Jr. ............. E04B 1/3205 52/223.7 |
| 3,511,000 | A | * | 5/1970 | Keuls .................... E04B 2/7863 52/126.4 |
| 3,798,852 | A | * | 3/1974 | Nicoll, Jr. ................. E04C 3/46 52/274 |
| 3,883,999 | A | * | 5/1975 | Nicoll, Jr. ................. E04C 3/46 52/105 |
| 4,034,527 | A | * | 7/1977 | Jalasjaa ........................... 52/233 |
| 4,074,476 | A | * | 2/1978 | Ordorika ......................... 52/79.2 |
| 4,531,564 | A | * | 7/1985 | Hanna .................... E04B 2/7405 160/229.1 |
| 4,608,799 | A | * | 9/1986 | Hasegawa ....................... 52/578 |
| 4,823,528 | A | * | 4/1989 | Faw ............................... 52/233 |
| 5,125,867 | A |   | 6/1992 | Solomon |
| 5,226,276 | A | * | 7/1993 | Cahill ...................... E04C 2/40 52/592.6 |
| D338,140 | S | * | 8/1993 | Scott, Jr. ....................... D11/155 |
| D343,509 | S | * | 1/1994 | Scott, Jr. ............................. D8/1 |
| 5,319,896 | A | * | 6/1994 | Winger ............................. 52/23 |
| 5,881,515 | A | * | 3/1999 | George ........................... 52/233 |
| 5,984,589 | A | * | 11/1999 | Ciccarello ........... E02D 29/0266 405/262 |
| 6,295,778 | B1 | * | 10/2001 | Burt ................................ 52/233 |
| 6,766,619 | B1 |   | 7/2004 | Franz |
| 6,786,015 | B2 | * | 9/2004 | Wilt ....................... E04D 13/158 52/233 |
| 7,596,916 | B1 | * | 10/2009 | Anderson ........................ 52/233 |
| 7,779,579 | B2 |   | 8/2010 | Mower |
| 7,810,277 | B2 | * | 10/2010 | Fakhari .................... A01G 1/08 362/152 |
| 2004/0187411 | A1 | * | 9/2004 | Clegg ............................. 52/233 |
| 2006/0000179 | A1 | * | 1/2006 | Albert ....................... E04B 2/16 52/606 |
| 2007/0130873 | A1 | * | 6/2007 | Fisher ............................. 52/596 |
| 2007/0245673 | A1 | * | 10/2007 | Cerrato ............................ 52/607 |
| 2007/0251182 | A1 | * | 11/2007 | Van Steinburg ............. 52/586.1 |
| 2008/0263968 | A1 |   | 10/2008 | Day |
| 2009/0044461 | A1 |   | 2/2009 | Diamond |
| 2009/0106102 | A1 |   | 4/2009 | Johnson |
| 2009/0133345 | A1 | * | 5/2009 | Wrightman ..................... 52/233 |
| 2009/0188196 | A1 | * | 7/2009 | MacDonald .................... 52/562 |
| 2010/0088970 | A1 |   | 4/2010 | Miller |
| 2010/0319285 | A1 | * | 12/2010 | Jewett et al. ................ 52/309.4 |
| 2010/0325971 | A1 |   | 12/2010 | Leahy |
| 2011/0023402 | A1 |   | 2/2011 | Fisher |
| 2011/0162318 | A1 | * | 7/2011 | Bucheger ................. E04B 2/44 52/745.1 |

* cited by examiner

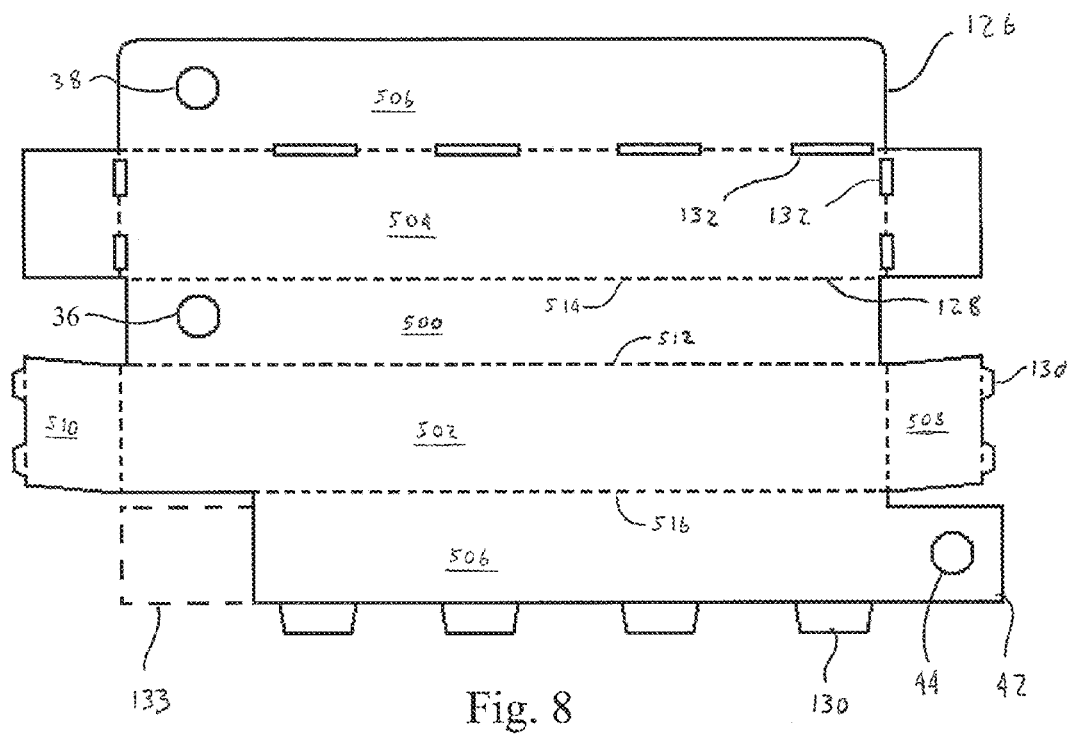
Fig. 8
Amended
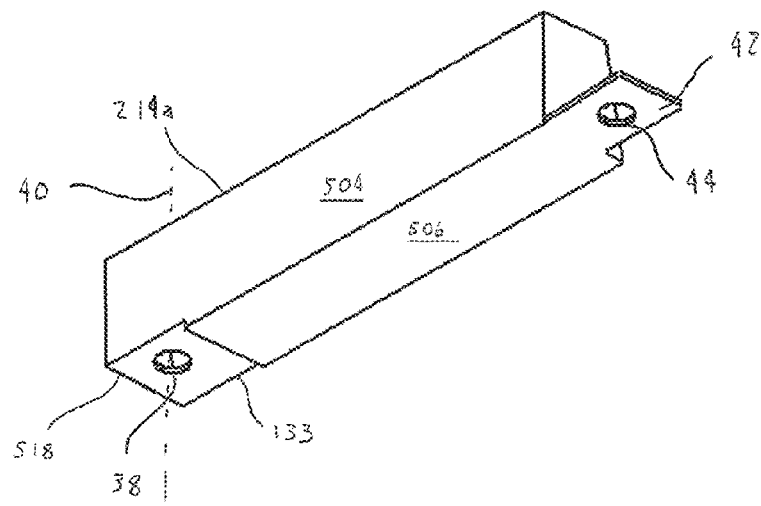
Fig. 9
Amended

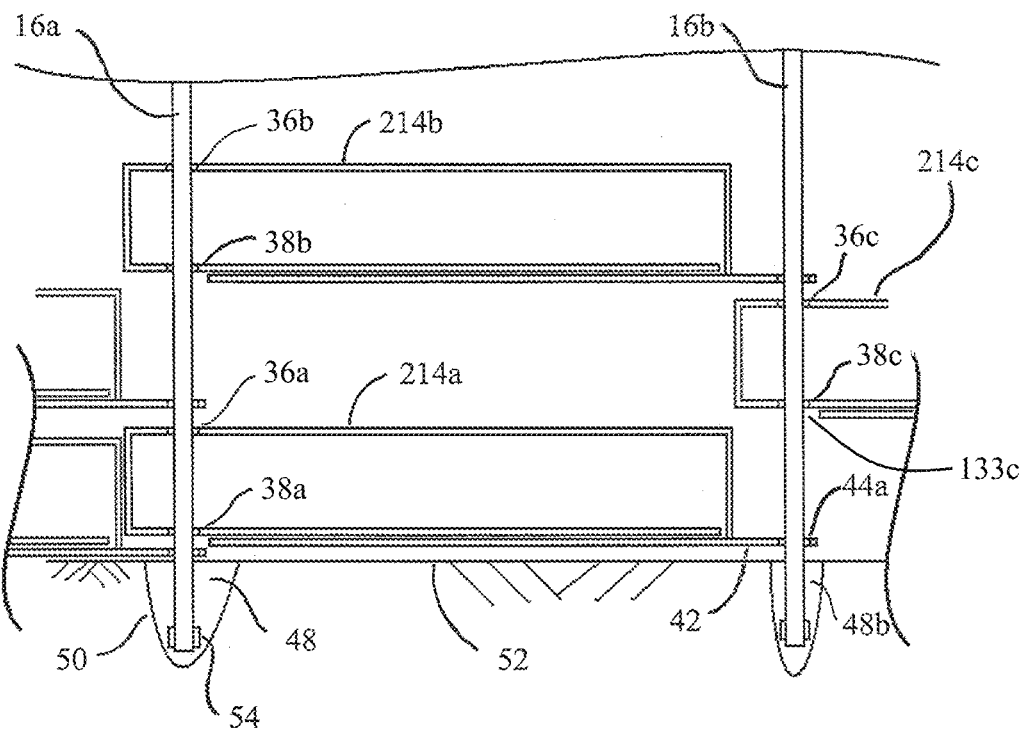
Fig. 10
Amended

PREFABRICATED BUILDING AND KIT

CROSS-REFERENCE TO RELATED APPLICATIONS

This application claims the benefit of U.S. Provisional Application No. 61/365,632, filed Jul. 19, 2010, the disclosure of which is incorporated herein by reference.

BACKGROUND OF THE INVENTION

This invention relates in general to a structure for housing people. More particularly, this invention relates to a structure that may be assembled with minimal labor or training using materials provided in a kit that is easy to transport to a site.

Emergency and temporary housing of displaced people is often necessary in refugee situations or in the aftermath of natural disasters. The ability to provide adequate shelter for people in these situations can be limited by factors such as the low amount of existing housing, limited money for constructing new housing, and lack of time to construct adequate housing. In these situations, emergency housing may consist of tents or shelters constructed with tarpaulins. It would be advantageous to provide housing that provides additional shelter.

SUMMARY OF THE INVENTION

This invention relates to a prefabricated building that includes a sheet folded to form a structural member defining an interior space. The structural member defines an upper guide hole that extends from the interior space of the structural member to the exterior of the structural member, and a lower guide hole that extends from the interior space of the structural member to the exterior of the structural member. The prefabricated building also includes a guide member that is fixed relative to a foundation. The structural member aligned so that the guide member passes through the upper guide hole and the lower guide hole.

Various aspects of this invention will become apparent to those skilled in the art from the following detailed description of the preferred embodiment, when read in light of the accompanying drawings.

BRIEF DESCRIPTION OF THE DRAWINGS

FIG. 4 is a perspective view similar to that of FIG. 3c, of the complete structural member made from the sheet of FIG. 3a.

FIG. 8 is an overhead plan view of an alternative sheet configured to be folded into a structural member.

FIG. 9 is a perspective view, taken from below, of the structural member assembled from the sheet of FIG. 8.

FIG. 10 is an exploded cross-sectional view of a portion of a wall taken along the line 10-10 of FIG. 1.

DETAILED DESCRIPTION OF THE PREFERRED EMBODIMENT

Figure 1:
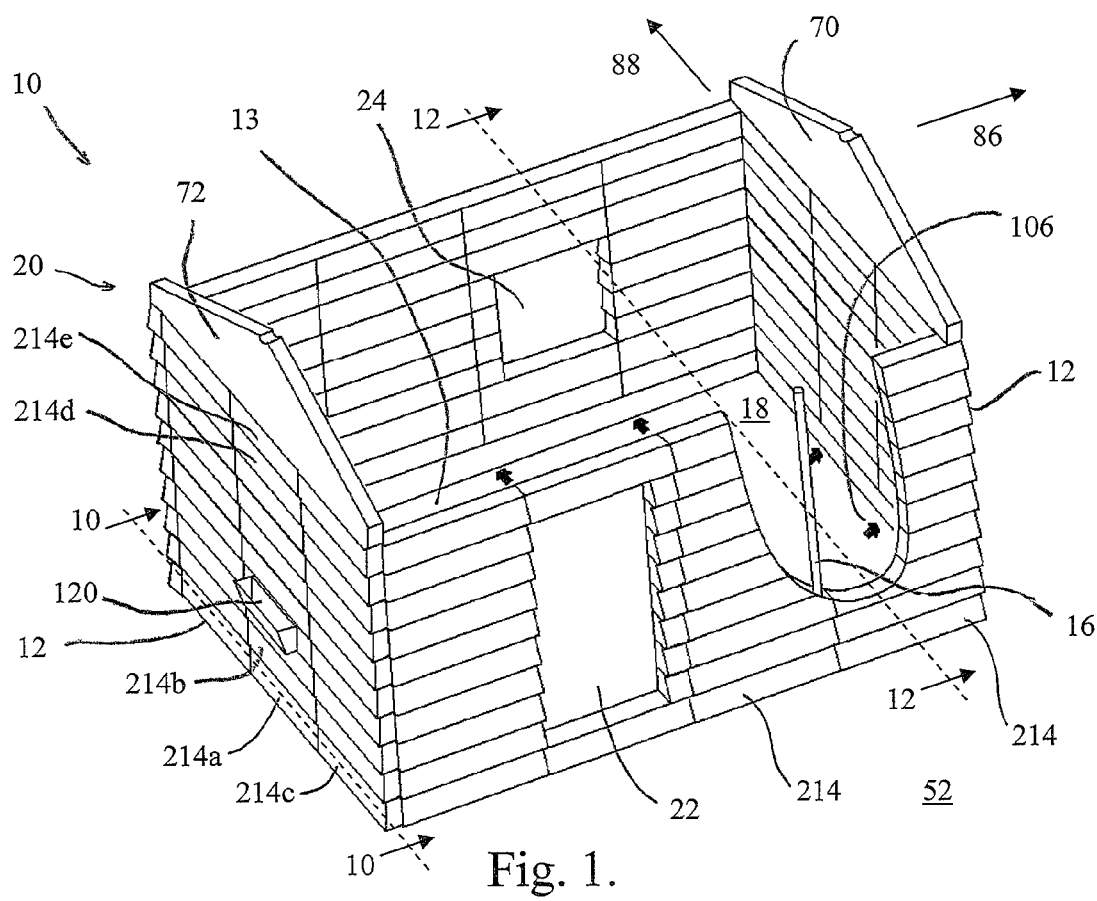
FIG. 1 is a perspective view of a partially assembled prefabricated structure, with part of the structure shown cut-away.
Figure 2:
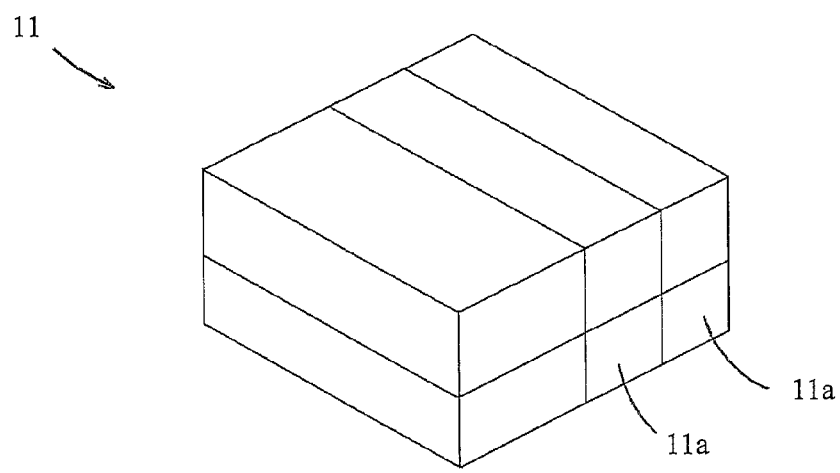
FIG. 2 is a perspective view of a kit containing materials to assemble the prefabricated structure of FIG. 1.

Referring now to the drawings, there is illustrated in FIG. 1 a partially cut-away, perspective view of a prefabricated building, indicated generally at 10. As shown in FIG. 2, the prefabricated building 10 is made of components that are provided in a kit generally indicated at 11. The kit 11 may be transported to a location selected for the construction of the prefabricated building 10 in order to provide a temporary or long-term structure. The kit 11 may be a single unit, but may also be designed to split into separate man-sized units 11a. Each man-sized unit 11a is of a size and weight suitable to be easily transported by an individual.

Referring back to FIG. 1, the prefabricated building 10 includes a plurality of walls 12. The walls 12 are disposed to define an occupant space 13. The walls 12 include a plurality of building blocks or structural members 14. The structural members 14 are aligned on a plurality of guide members 16. One guide member 16 is visible in the cut-away portion of the wall 12. The guide members 16 are fixed relative to a site or ground 52. The prefabricated building 10 includes a floor 18, and a roof, indicated generally at 20. The prefabricated building 10 also includes an optional door 22 and an optional window 24. The various components of the prefabricated building 10, and the process for assembling the prefabricated building 10, will be described below.

Figure 3A:
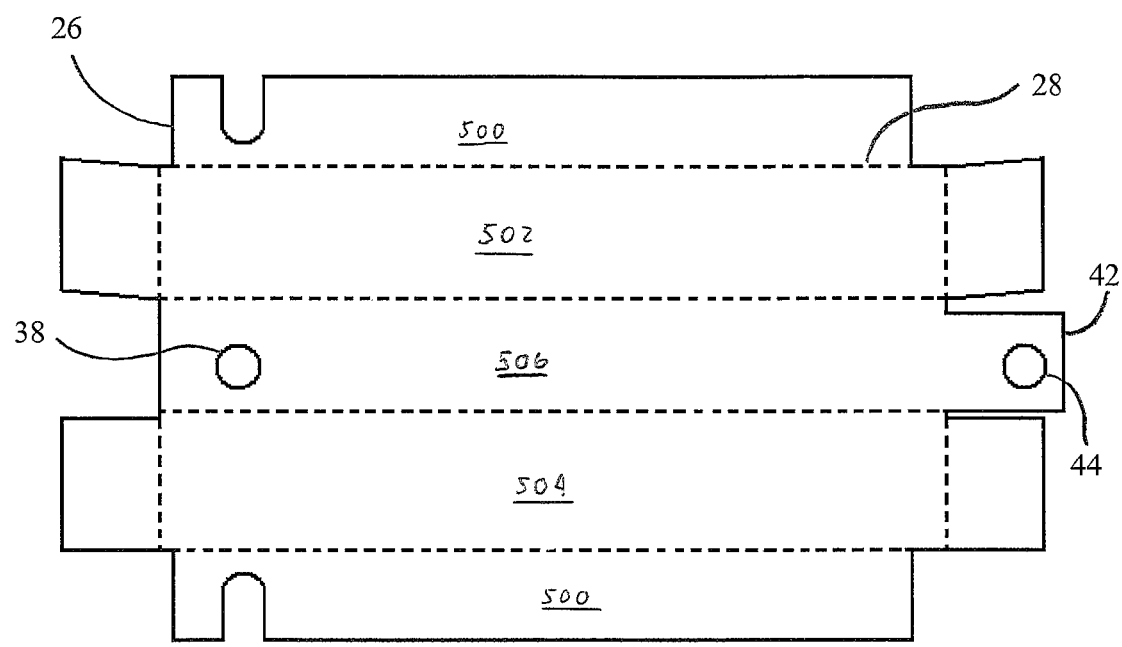
FIG. 3a is an overhead plan view of a sheet configured to be folded into a structural member used in the assembly of the prefabricated structure of FIG. 1.

Referring to FIG. 3a, a sheet 26 is shown. The sheet 26 is made of corrugated polypropylene and is die cut. The die cut sheet 26 may be made of other materials that provide the desired resistance to anticipated environmental conditions. The illustrated corrugated polypropylene provides the additional advantage of light weight, allowing the sheet 26 to be easily handled by a single individual.

Figure 3B:
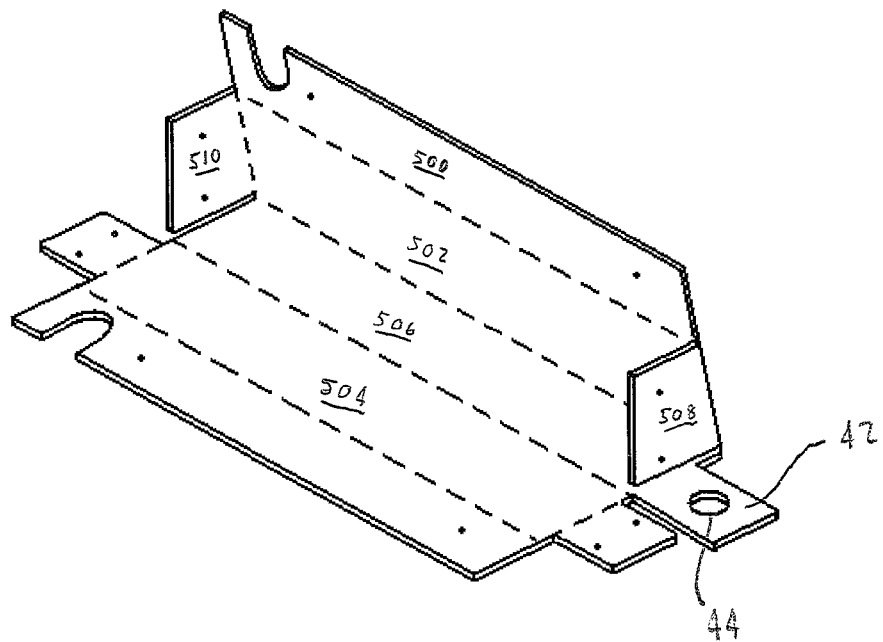
FIG. 3b is a perspective view, taken from above, of the sheet of FIG. 3a partially folded into a structural member.
Figure 3C:
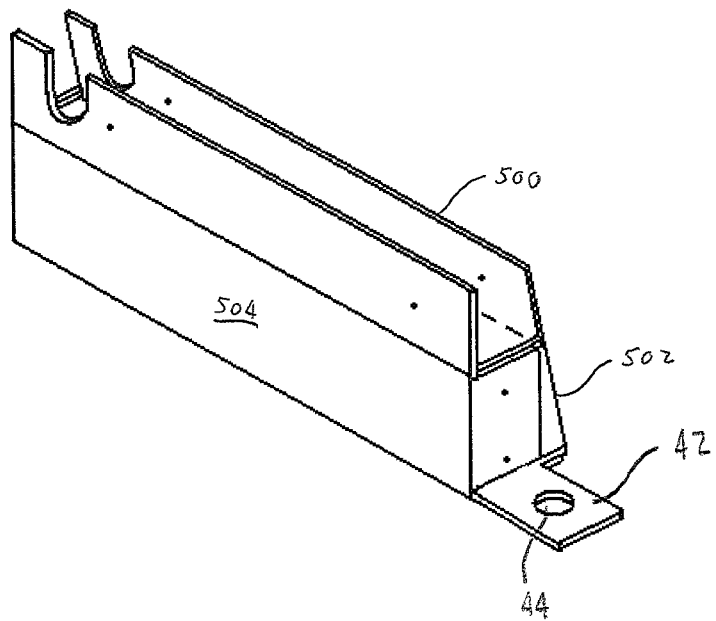
FIG. 3c is a perspective view similar to that of FIG. 3b, of the sheet further folded into a structural member.
Figure 5:
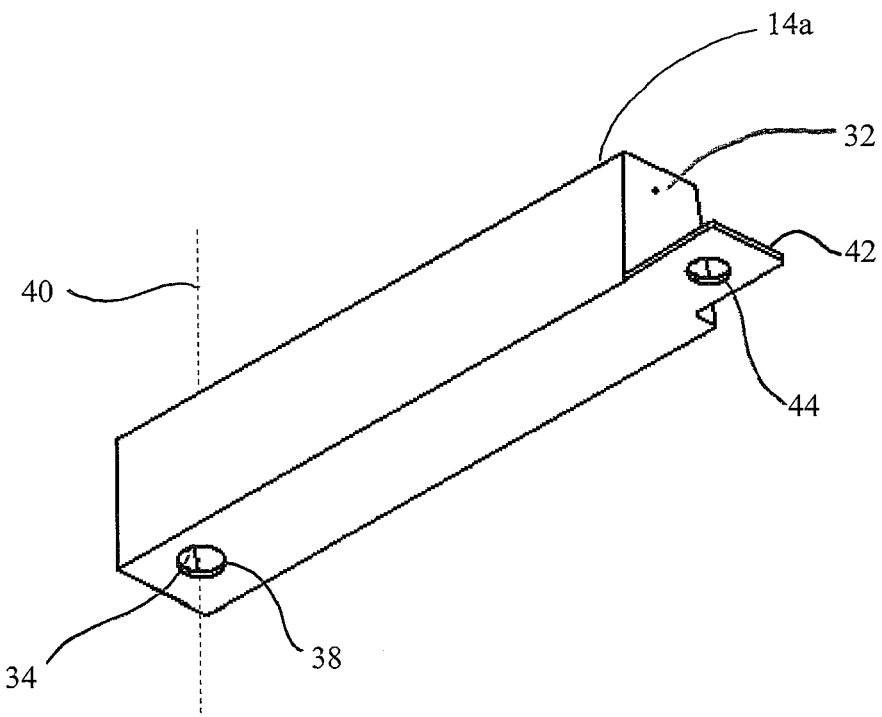
FIG. 5 is a perspective view, taken from below, of the structural member of FIG. 4.
Figure 6:
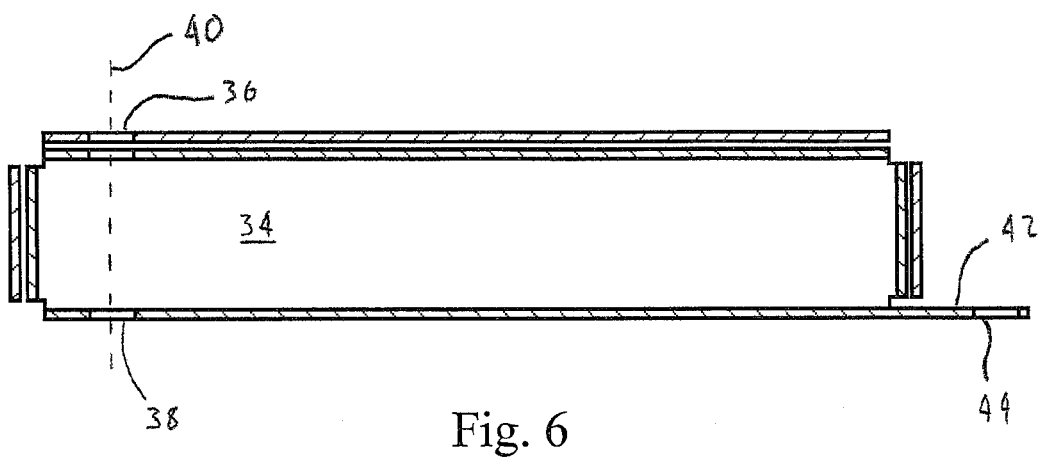
FIG. 6 is a cross-sectional view of the structural member, taken along the line 6-6 of FIG. 4.
Figure 7:
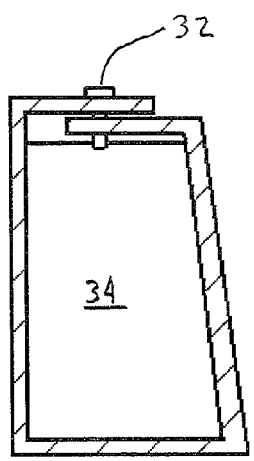
FIG. 7 is a cross-sectional view of the structural member, taken along the line 7-7 of FIG. 4.

The sheet 26 includes fold guides 28 that are scores in the sheet 26. It should be appreciated that the fold guides 28 may include cuts, scores, pre-folds, perforations, visible guide lines, printed instructions, or other desired guides and that the type of fold guides may vary depending on the type of material the sheet 26 is made of. The fold guides 28 facilitate the folding of the sheet 26 into a structural member 14 such as the structural member 14a, shown in a perspective view from above in FIG. 4 and in perspective from below in FIG. 5. FIGS. 3b and 3c illustrate the sheet 26 in two intermediate points in the process of being folded into the structural member 14a. Cross-sections taken along the lines 6-6 and 7-7 are shown in FIGS. 6 and 7, respectively. As can been seen, the structural member 14 include areas in which multiple layers of the sheet 26 overlap.

The sheet 26 is configured so that a single person may fold the sheet 26 into the structural member 14a. It should be appreciated that larger sheets may be used that require multiple people to fold into a structural member. This could be done, for example, to reduce the number of structural members used in the prefabricated building 10.

Figure 4:
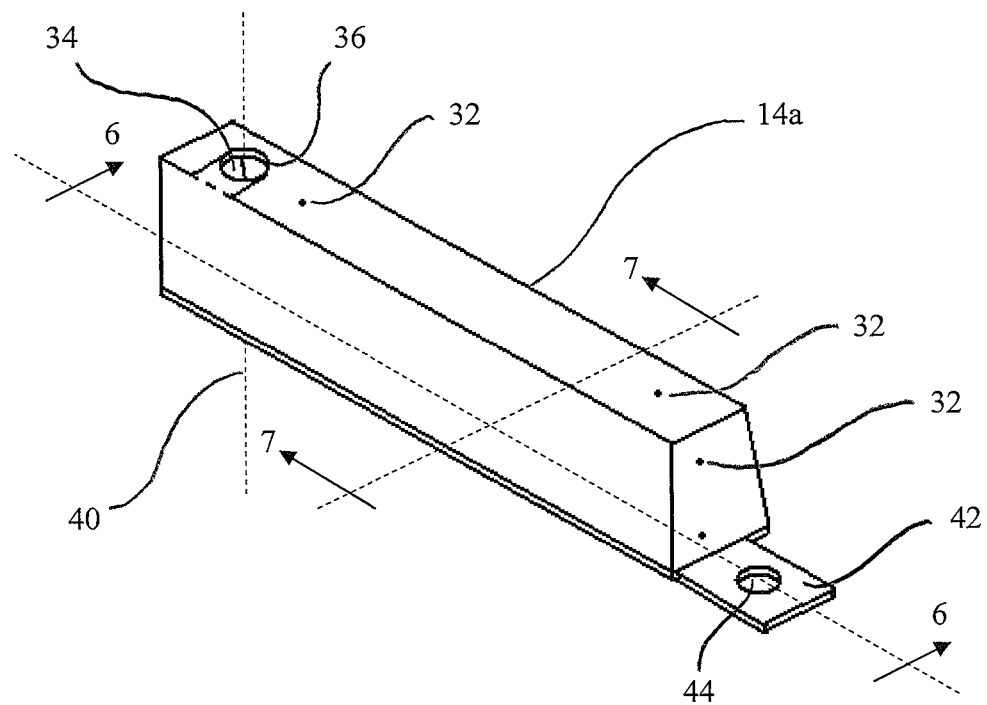

In further reference to FIG. 4, optional fasteners 32 are installed to help keep the structural member 14a from unfolding and to help maintain the shape of the structural member 14a. The illustrated fasteners 32 are plastic screws, though other types of fasteners, such as pins, staples, loop and hook fabric, or adhesives, may be used if desired. Additionally or optionally, the structural member 14a may include tabs that engage with slots in the structural member 14a in order to help maintain the shape of the structural member 14a. Tabs engaging with slots may allow the structural member 14a to be assembled without the use of tools.

The assembled structural member 14a defines a hollow block and defines an interior space 34. The structural member 14a includes an upper guide hole 36 that extends from the interior space 34 to the exterior of the structural member 14a. The upper guide hole 36 is created by complementary U-shaped slots in the sheet 26. However, it should be appreciated that the upper guide hole 36 may be a hole through a portion of the sheet 26. As seen in FIG. 5, the structural member 14a also includes a lower guide hole 38 that extends from the interior space 34 to the exterior of the structural member 14a. The upper guide hole 36 and the lower guide hole 38 are both circular openings, though they may be other desired shapes. The upper guide hole 36 and the lower guide hole 38 are located on opposite sides of the structural member, and are coaxial on the axis 40. The structural member 14a also includes a tab 42 that defines a tab guide hole 44. The tab guide hole 44 is a circular opening, though it may be some other desired shape.

Referring to FIG. 8, an alternative sheet 126 is shown. The alternative sheet 126 includes fold guides 128 that facilitate the folding of the sheet 126 into a structural member 214a, shown in a perspective view from below in FIG. 9. The structural member 214a includes many of the same features as the structural member 14a, and similar features will be identified with the same number.

As shown in FIG. 8, the sheet 126 includes tabs 130 that are inserted into respective slots 132 when then the sheet 126 is assembled into the structural member 214a. The tabs 130 engage the respective slots 126 in order to help keep the structural member 214a from unfolding and to help maintain the shape of the structural member 214a. This reduces the need for the optional fasteners 32 used in structural member 14. This also allows the structural member 214a to be assembled by an individual without the use of tools.

The structural member 214a includes a top panel 500, an outer wall panel 502, an inner wall panel 504, a bottom panel 506, a first end panel 508, and a second end panel 510. The top panel 500 has a first longitudinal edge 512 connected to a first longitudinal edge of the outer wall panel 502 and has a second, opposite longitudinal edge 514 connected to a first longitudinal edge of the inner wall panel 504. The bottom panel 506 has a first longitudinal edge 516 connected to a second, opposite longitudinal edge of the outer wall panel 502. The first end panel 508 and the second end panel 510 are connected to the outer wall panel 502. The top panel 500 and bottom panel 506 define a top guide hole 36 and a bottom guide hole 38, respectively, near a first end 518. The top guide hole 36 and the bottom guide hole 38 are in lateral alignment such that, upon assembly, the guide holes in the top and bottom panels are vertically aligned on the axis 40. It should be appreciated that while one particular configuration of the sheet 126 has been described, the sheet 126 may arranged in other desired shapes that allow it to be folded into a building block.

As shown in FIG. 9, the structural member 214a defines an indent 133. The indent 133 is a void that will accommodate a tab 42 of a similar, adjacent structural member. The location of the excluded material that defines the indent 133 is shown in broken line in FIG. 8. By accommodating the tab 42 of the adjacent structural member in the indent 133, a series of structural members 214a, b, c, d, e may be arranged in an interconnected, stacked relationship while remaining level. This will be better understood in reference to FIGS. 10 and 11.

Referring now to FIG. 10, an exploded, cross-sectional view of a portion of the wall 12 of the prefabricated building 10 is shown. The wall 12 is shown with multiple structural members 214a, b, c, d, e spaced apart from each other for clarity. A guide member 16a is fixed relative to a foundation 48. The illustrated guide member 16a is a one-inch diameter fiberglass pole. The guide member 16a is made in a size sufficient to fit through the upper guide hole 36, the lower guide hole 38, and the tab guide hole 44. The guide member 16a serves to aid in the proper alignment of the structural member 214a during assembly of the prefabricated building 10 and to help hold the assembled prefabricated building 10 in position. It should be appreciated that the guide member 16a may be made of other materials, such as sections of PVC pipe or aluminum conduit, if desired. The guide member 16a may also have a cross-sectional shape other than circular, if desired. The guide member 16a as well as the upper guide hole 36, and the lower guide hole 38 may have a polygonal cross-sectional shape, such as the square cross-sectional shape shown in FIG. 18. It may be desirable for the guide member 16 as well as the upper guide hole 36 and the lower guide hole 38 to have square cross-sectional shapes as this would allow the upper guide hole 36 and the lower guide hole 38 to engage the guide member 16 if a force is applied that would cause the structural member 214a to rotate relative to the guide member 16. This could improve the prefabricated building's ability to resist movement under some applied forces.

The illustrated foundation 48 is concrete cement that is poured into excavations 50 in the ground 52. The foundation 48 may include other materials or mechanisms suitable to hold the guide member 16a in place, such as cement blocks that the guide members are bolted to, or freezing the guide members in place with ice, and the desired foundation may vary depending on the location in which the prefabricated building 10 is being installed. The guide member 16a may include optional flanges 54 to help hold the guide member 16a in place relative to the foundation 48.

The structural member 214a is aligned so that the guide member 16a passes through the upper guide hole 36a and the lower guide hole 38a. It should be appreciated that the structural member 214a is partially restrained against horizontal movement relative to the foundation 48 by the guide member 16a.

A second guide member 16b is fixed relative to a second foundation 48b. The second guide member 16b is the same size and is made of the same materials as guide member 16a. This makes assembly of the prefabricated building 10 easier, as the pieces are interchangeable. However, this is not necessary, and the second guide member 16b may be a different size or made of a different material than the guide member 16a. Similarly, the second foundation 48b is similar to the foundation 48, but may be of a different size or made of a different material, if desired.

The structural member 214a is aligned so that the second guide member 16b passes through the tab guide hole 44a. It should be appreciated that the structural member 214a is partially restrained against horizontal movement relative to the foundation 48b by the second guide member 16b. Further, the structural member 214a will engage the guide member 16a and the second guide member 16b to restrain horizontal movement of the structural member 214a relative to the foundation 48. It should be appreciated that horizontal movement of the structural member 214a relative to the foundation 48 is not necessarily completely prevented, but in the illustrated embodiment that horizontal movement will be limited based on, for example, the size difference between the upper guide hole 36a, the lower guide hole 38a and the first guide member 16a, as well as the size difference between the tab guide hole 44a and the second guide member 16b, as well as the flexibility of the first guide member 16a and the second guide member 16b.

The prefabricated building 10 includes a second structural member 214b. A second sheet (not shown) is folded to create the second structural member 214b. The second structural member 214b is the same size and is made of the same materials as the structural member 214a. This makes assembly of the prefabricated building 10 easier, as the pieces are interchangeable. However, this is not necessary, and the second structural member 214b may be a different size or made of a different material than the structural member 214a. The second structural member 214b is aligned so that the guide member 16a passes through an upper guide hole 36b of the second structural member 214b and a lower guide hole 38b of the second structural member 214b. The second structural member 214b is also aligned so that the second guide member 16b passes through a tab guide hole 44b defined by a tab 42b of the second structural member 214b.

The prefabricated building 10 includes a third structural member 214c. A third sheet (not shown) is folded to create the third structural member 214c. The third structural member 214c is the same size and is made of the same materials as the structural member 214a, but this is not necessary. The third structural member 214c is aligned so that the second guide member 16b passes through an upper guide hole 36c of the third structural member 214c and a lower guide hole 38c of the third structural member 214c. The third structural member 214c is aligned so that the tab 42 of the structural member 214a is located in an indent 133c of the third structural member 214c. The third structural member 214c is aligned so that it is between the tab 42 of the structural member 214a and the tab 42b of the second structural member 214b. It should be appreciated that the third structural member 214c is also aligned so that a third guide member (not shown) passes through a tab guide hole (not shown) of the third structural member 214c.

Figure 11:
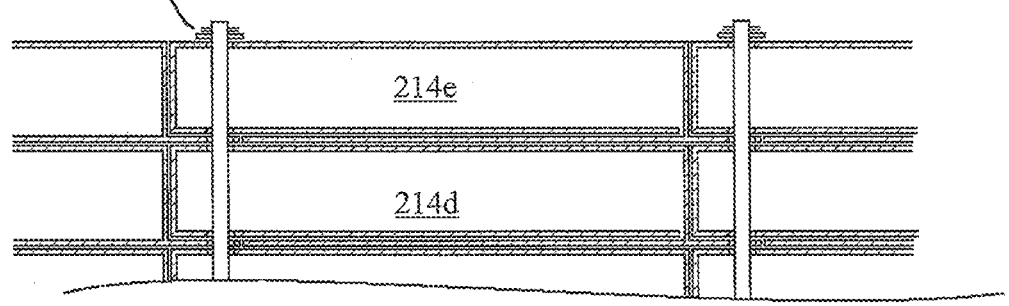
FIG. 11 is a cross-sectional view of the wall taken along the line 10-10 of FIG. 1.
Figure 11:
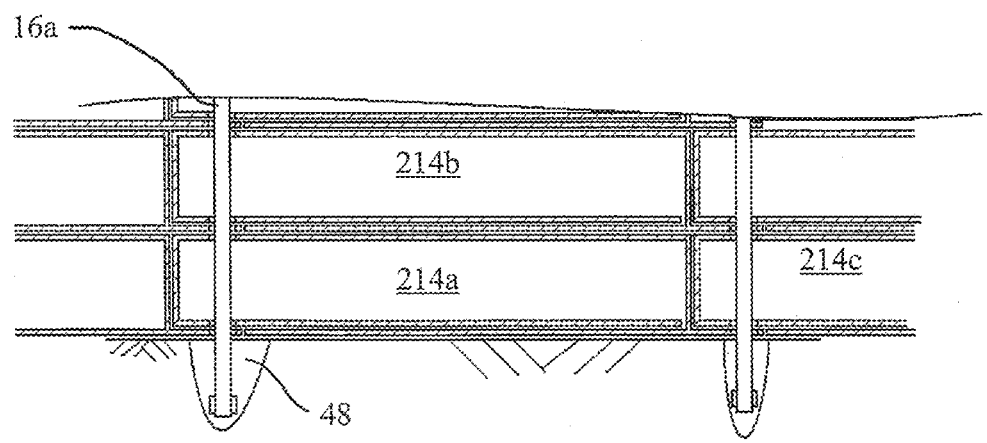

Referring now to FIG. 11, a cross-sectional view of a portion of the assembled wall 12 is shown. As can be seen in reference to FIG. 1, the illustrated wall 12 has a height of ten structural members. However, in FIG. 11, only the two lower members, 214a and 214b, and the upper two structural members, 214d and 214e, are shown in their entirety. It should be appreciated that the number of structural members 214 that have to be stacked in order to create the wall 12 may vary depending on the desired height of the wall 12 and the height of the structural members 214. A restraint 56a is fixed relative to the guide member 16a above the uppermost structural member 214e. The restraint 56 serves to help restrain the structural member 214e against vertical movement away from the foundation 48. The illustrated restraint 56 is a plate that is held in place by a push nut that is slid onto the guide member 16a. Alternatively, the restraint 56 may be some other desired item suitable to help restrain the structural member 214e against vertical movement away from the foundation 48, such as a speed nut, a pin inserted through the guide member 16a, or a flange. It should be appreciated that the restraint 56 restrains the structural member 214e against vertical movement away from the foundation 48, while the structural member 214e restrains a structural member 214d against vertical movement away from the foundation 48, and so on down the wall 12. It should also be appreciated that by tightening the restraint 56 against the structural member 214e, the guide member 16a may be put in tension.

Figure 12:
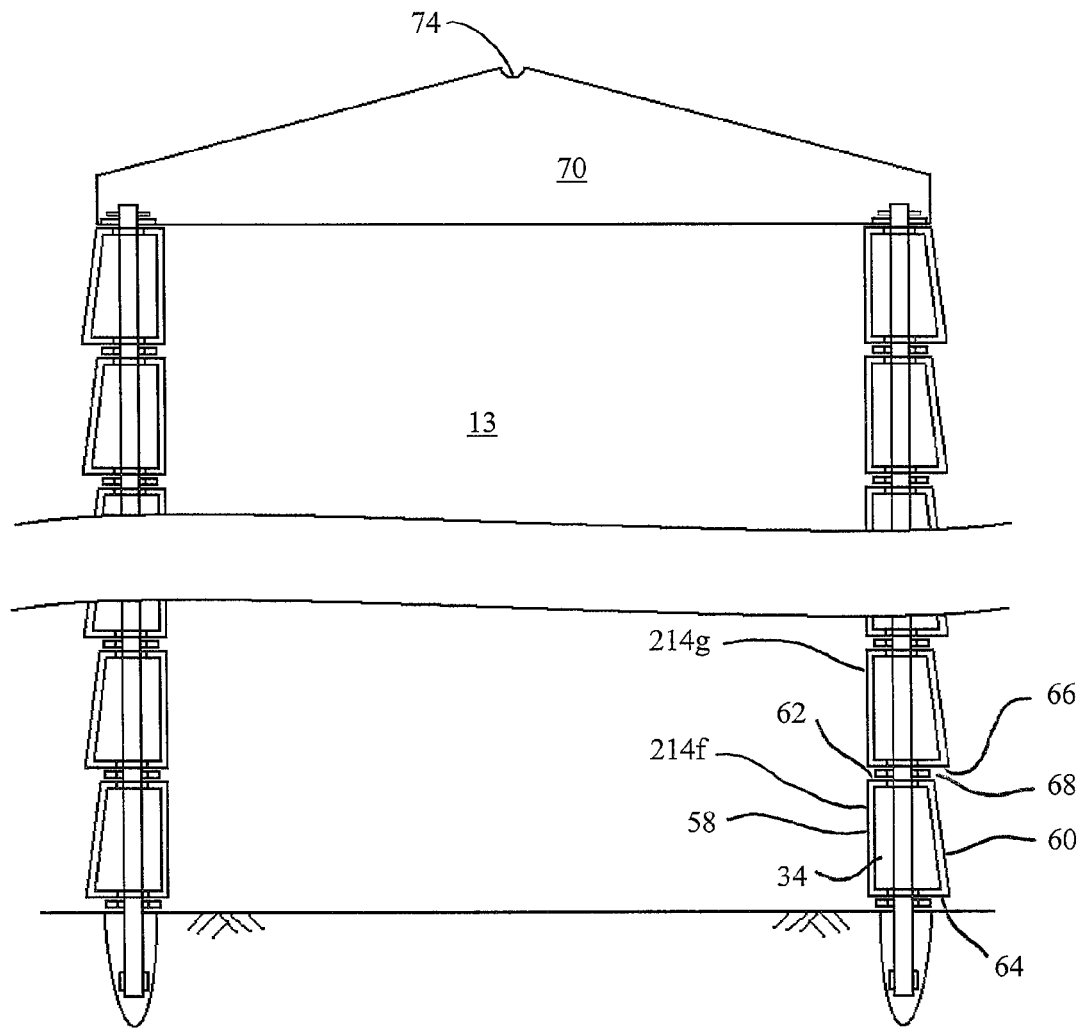
FIG. 12 is a cross-sectional view of the prefabricated structure, taken along the line 12-12 of FIG. 1.

Referring now to FIG. 12, a cross-sectional view of the prefabricated building 10, taken along the line 12-12 of FIG. 1, is shown. As can be seen, the structural member 214f includes an interior wall 58 and an opposed exterior wall 60. The interior wall 58 and the exterior wall 60 are spaced apart to define the interior space 34. The structural member 214f also includes an upper surface 62 and a lower surface 64. In the illustrated structural member 214f, the interior wall 58 and the exterior wall 60 are non parallel while the upper surface 62 and the lower surface 64 are parallel. This gives the structural member 214f a trapezoidal cross-sectional shape. It should be appreciated that the structural member 214f may have some other cross-sectional shape, if desired. Each of the structural members 214 has the same cross-sectional shape, although this is not necessary. The parallel upper surface 62 and lower surface 64 help in properly aligning the structural members 214 with each other when they are assembled as the wall 12.

The structural member 214f tapers toward the upper surface 62, with the distance between the interior wall 58 and the exterior wall 60 being greater near the lower surface 64. As a result, there is an overhang 66 created when the structural member 214g is placed over the structural member 214f. This overhang helps prevent water on the exterior wall 60 from migrating into a horizontal seam 68 between the structural member 214f and 214g. It should be appreciated that caulk, adhesives, or some other barrier may be used to help prevent migration of water, air, or contaminants through the horizontal seam 68, if desired. Further, caulk, adhesives, or some other barrier may be used in vertical seams such as 69, shown in FIG. 13.

The prefabricated building 10 also includes a roof support 70. The roof support 70 is made of corrugated polypropylene, and is folded from a sheet (not shown). Alternatively, the roof support 70 may be made of other materials suitable to support the roof load. As can be seen in reference to FIG. 1, the prefabricated building 10 may include multiple, similar roof supports, and will preferably have at least two roof supports 70 and 72. In the illustrated prefabricated building 10, the roof supports 70 and 72 are located at opposite sides of the prefabricated building 10, and act as gables. The weight of the roof supports 70 and 72 is supported by the structural members 214 that comprise the walls 12.

Figure 13:
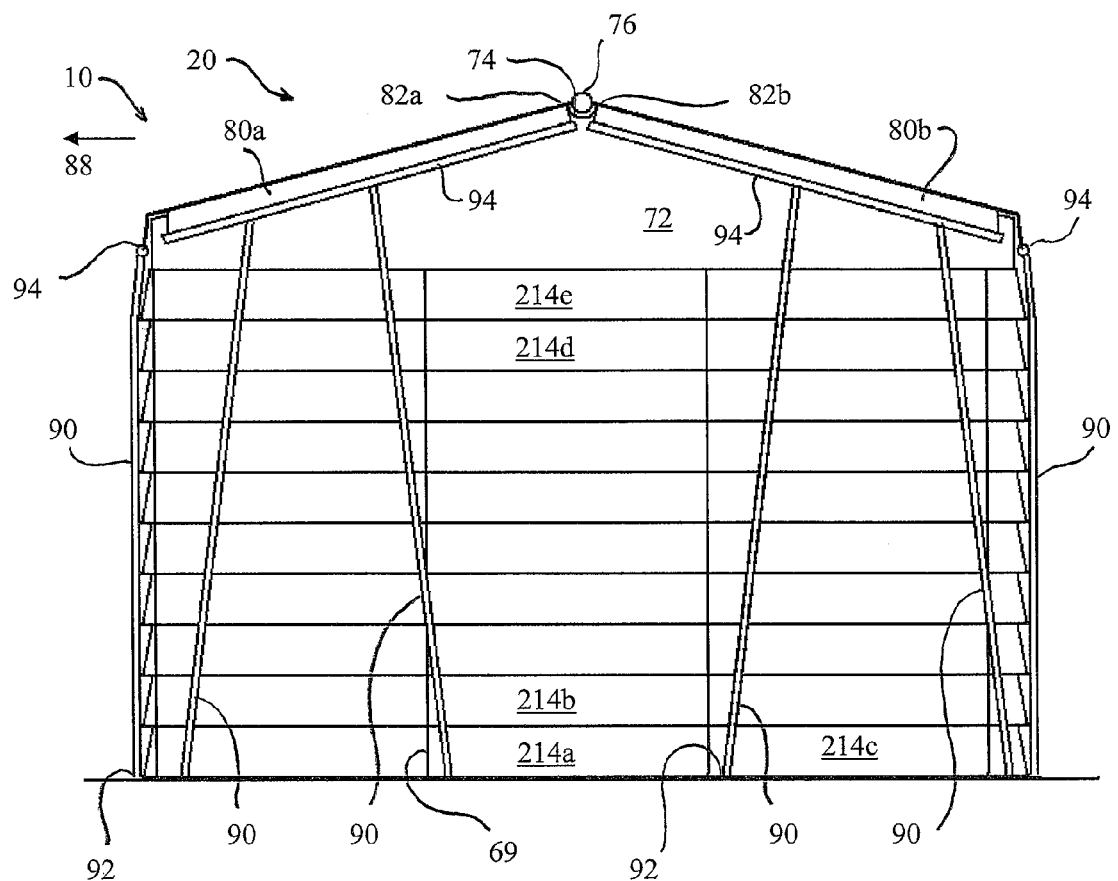
FIG. 13 is an end view of the assembled prefabricated structure.

As seen in FIG. 12, the roof support 70 includes a ridge support 74. As seen in FIG. 13, the ridge support 74 supports a ridge member 76. The ridge member 76 is part of the roof 20. The illustrated ridge member 76 is a two-inch diameter aluminum pole, and the ridge support 74 is a half-round space in the roof support 70 that accommodates the pole. The ridge member 76 may be made of other desired materials that are suitable to support the roof, and the ridge support 74 may be other desired designs that are suitable to support the ridge member 76. For example, the ridge member may be a section of PVC pipe, or a length of wood lumber, and the ridge support may be a protrusion on the roof support, or a mechanical fastener such as screws or adhesives.

The illustrated roof 20 comprises a first roof panel 80a attached at a ridge end 82a to the ridge member 76, and a second roof panel 80b attached at a ridge end 82b to the ridge member 76. The first roof panel 80a is a nylon mesh laminated with Teflon. The first roof panel 80a may be made of other materials that provide the desired resistance to environmental conditions. It should be appreciated that the first roof panel may be made in different colors, either to collect solar energy, reflect solar energy, to blend in with the location in which the prefabricated building 10 is assembled, or to visually stand out in the location in which the prefabricated building 10 is assembled. The roof 20 may include text or icons that are intended to be visible to people in aircraft. Additionally, the first roof panel 80a may be made of a mesh or net, or may be made of a transparent or translucent material, in order to allow additional air or light into the occupant space 13, if desired.

Figure 14:
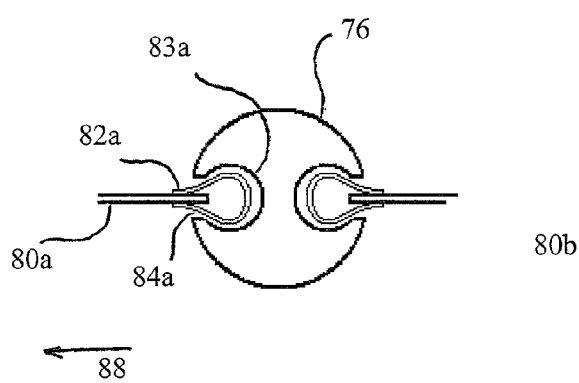
FIG. 14 is a cross-sectional view of a ridge member used in the assembly of the roof of the prefabricated structure shown in FIG. 1.

Referring to FIG. 14, a cross-sectional view of the ridge member 76 is shown. The ridge member 76 includes a first slot 83a that accommodates and traps the ridge end 82a of the first roof panel 80a. In the illustrated roof 20, the ridge end 82a of the first roof panel 80a includes metal laces 84a that allow the first roof panel 80a to be mated to the ridge member 76 by sliding the laces 84a into the first slot 83a in a lengthwise direction of the ridge member 76 (the direction indicated by the arrow 86 in FIG. 1). However, the laces 84a are large enough that they can not be pulled out of the first slot 83a in a crosswise direction (the direction indicated by the arrow 88). If the laces 84a are pulled in the crosswise direction 88, they engage with the ridge member 76 in order to restrain motion in that direction. The ridge end 82a of the first roof panel 80a may engage with the ridge member 76 using an engaging member other than metal laces, if desired. For example, the ridge end 82a of the first roof panel 80a may be folded over a cable and sewn to itself, providing an increased thickness at the ridge end 82a. Further, the ridge end 82a of the first roof panel 80a may be mated to the ridge member 76 by some other fastener or mechanism, if desired, such as by using mechanical clamps, hook and loop cloth, stitching, welding, or adhesives.

The second roof panel 80b is mated to the ridge member 76 in a similar manner to the first roof panel 80a, and will not be separately described. It should be appreciated that the roof 20 may include a single roof panel, rather than the separate first roof panel 80a and second roof panel 80b, as described. Further, a single roof panel would not need to be attached to the ridge member 76. Rather, for example, the single roof panel may rest on the ridge member 76.

Referring back to FIG. 13, a plurality of restraining members 90 are attached to the roof 20. Each restraining member 90 is also attached to an anchor 92, which is set in the foundation 48, and is drawn taut between the roof 20 and the anchor 92. The restraining members 90 provide a force to help keep the roof 20 in contact with the roof support 70. The illustrated restraining members 90 are nylon tie down straps, though other materials that are sufficient to provide the desired force may be used, such as rope, rubber straps, or cord.

Figure 15:
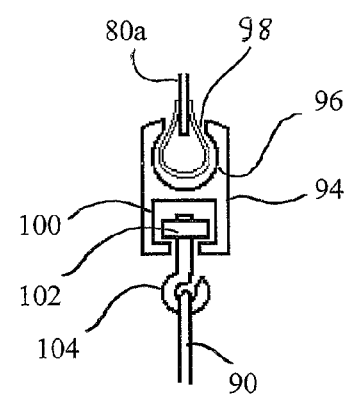
FIG. 15 is a cross-sectional view of a load distribution member used in the assembly of the roof of the prefabricated structure shown in FIG. 1.

The roof 20 includes a plurality of optional load distribution members 94. The load distribution members 94 are attached to the first roof panel 80a and the second roof panel 80b, and the restraining members 90 are attached to the load distribution members 94. The load distribution members 94 serve to take the load placed on the roof by the restraining members 90 and spread it out along the first roof panel 80a and the second roof panel 80b. As shown in FIG. 15, the illustrated load distribution members 94 are aluminum poles that include a first slot 96 that engage perimeter laces 98 on the first roof panel 80a. The load distribution members 94 include a second slot 100 that engages a nut 102 attached to an eye-bolt 104 the restraining member 90 is attached to. It should be appreciated that the load distribution member 94 may engage the first roof panel 80a using a fastener or mechanism other than that illustrated, if desired, such as by using mechanical clamps, hook and loop cloth, stitching, or adhesives. Also, the load distribution member 94 may engage the restraining member 90 using a fastener or mechanism other than that illustrated, if desired, such as by using mechanical clamps, hook and loop cloth, stitching, adhesives, or hooks and loops. Further, the load distribution member 94 may be integrated into the first roof panel 80a, such as, for example, an aluminum rod sewn into a pocket in the first roof panel 80a. Additionally, the load distribution member may be replaced with direct fastening of the restraining member 90 to the first roof panel 80a using fasteners or mechanisms such as, for example, clamps or hooks and eyelets.

Figure 13B:
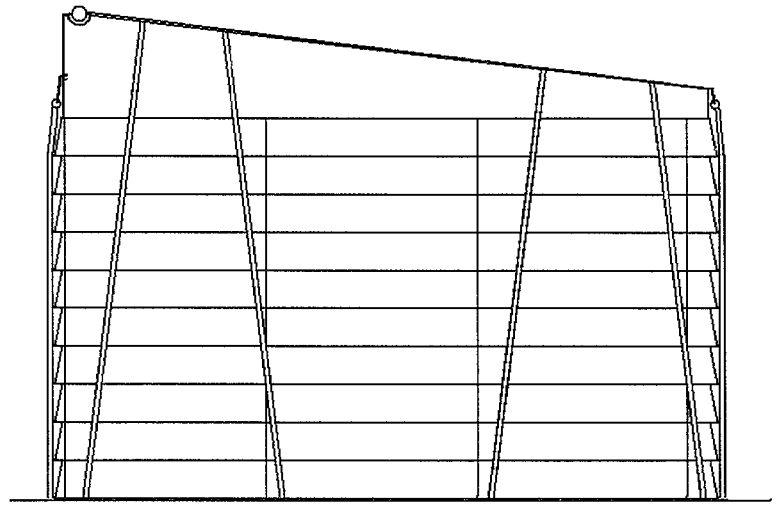
FIG. 13b is an end view of a prefabricated building having an alternative roof design.
Figure 13C:
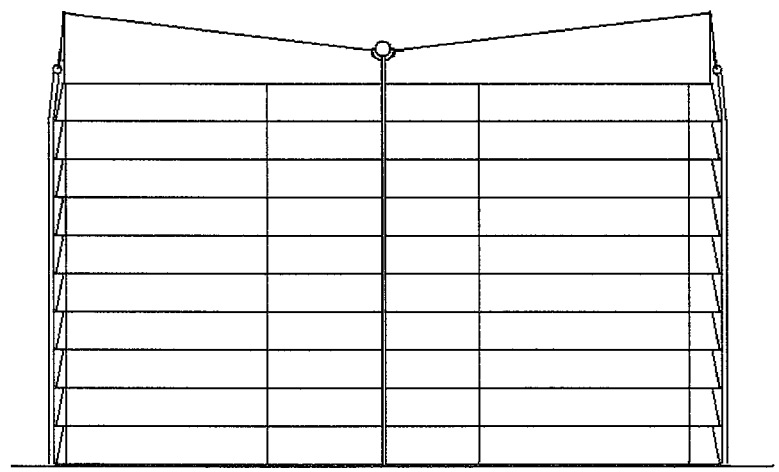
FIG. 13c is an end view of a prefabricated building having an alternative roof design.

It should be appreciated that the roof support 70 may have a different design from that illustrated. Alternative roof support designs are shown in the end views of FIGS. 13b, and 13c. The design of the roof support 70 may be selected for reasons including the anticipated climate at the site, desired path for run-off, or aesthetic reasons.

Referring back to FIG. 1, a method for assembling the prefabricated building 10 will now be described. When the site where the prefabricated building 10 is to be assembled is identified, the ground 52 is leveled. The floor 18 is then laid out on the leveled ground 52. The floor 18 serves to provide a barrier against water, insects, and contaminants migrating from the ground 52 into the occupant space 13. The illustrated floor 18 is made of a nylon mesh laminated with Teflon, although it may be made of other desired materials. It should be appreciated that the material used for the floor 18 may vary depending on the anticipated location of the site and condition of the ground 52. The floor 18 includes an optional template 106. The template 106 provides guidance on the proper locations of the excavations 50.

The excavations 50 are dug, and the guide members 16a are inserted into the excavations 50. The generally vertically extending guide members 16a are arranged in a horizontally spaced apart relationship corresponding to a desired wall structure. The structural members 214 are then assembled from the sheets 26. The structural members 214 are disposed on the guide members 16a to create the walls 12. The structural members 214 are arranged in an interconnected and stacked relationship with the aid of the guide members 16a to define the wall structure. Each structural member 214 has a first end provided with a vertically extending guide hole 36 and 38 having one of the guide members extending therethrough, and a second end coupled to a first end of a horizontally adjacent block. The second end of the first structural member 214 is coupled to the first end of the horizontally adjacent structural member 214 when the indent 133 of the horizontally adjacent structural member overlays the tab 42 of the first structural member. The lowest layer of structural members 214, nearest the ground 52, is assembled first, and the edge of the floor 18 is then draped over this lowest layer. This provides a lip that helps to prevent water and other contaminants from outside the prefabricated building 10 from entering the occupant space 13. Additional layers of structural members 214 are then disposed above the lowest layer, to reach the desired height of the wall 12. Spaces for any doors 22 and windows 24 may be created by not installing structural members 214 in those locations.

When the walls 12 are at the desired height, cement for the foundations 48 is mixed and poured in the excavations around the guide members 16a. The anchors 92 are also inserted into the foundations 48. When the foundations 48 are sufficiently set, the restraints 56 are installed on the guide members 16a. The roof supports 70 are also assembled and installed on the walls 12.

The first roof panel 80a and the second roof panel 80b are attached to the ridge member 76, and the ridge member 76 is placed on the ridge support 74. The load distribution members 94 are then attached to the edges of the first roof panel 80a and the second roof panel 80b. The restraining members 90 are then attached to the load distribution members 94 and the anchors 92. The restraining members 90 are drawn taut in order to provide a force on the roof 20 that helps keep the roof 20 in place over the occupant space 13 and further is applied to the roof supports 70 through the ridge member 76 in order to help keep the roof supports 70 and the structural members 214 in position. Additional components such as doors, windows, and aesthetic features may then be applied to the prefabricated building 10.

Figure 16:
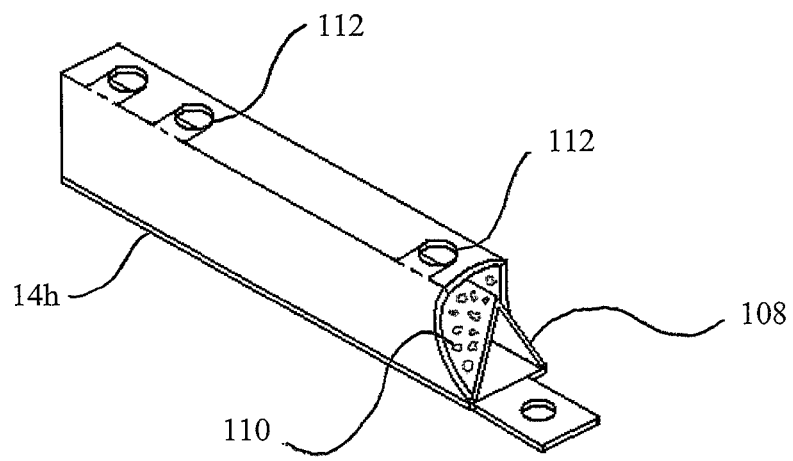
FIG. 16 is a perspective view, partially cut-away, of an alternative structural member with a reinforcing member suitable for the assembly of the prefabricated structure shown in FIG. 1.

The prefabricated building 10 may include additional, optional features, such as a structural member reinforcement 108 shown in FIG. 16. The structural member reinforcement 108 is a V-shaped piece of corrugated polypropylene, sized to be inserted into the interior space 34 one of the structural members 214. The structural member reinforcement 108 serves to support a loose fill material 110. The loose fill material 110 may be added to one or more of the structural members 14 in order to increase the weight of the lower layers of the prefabricated building 10, or to limit the passage of light, sound, and objects through portions of the wall 12. The structural member reinforcement 108 is made from a sheet of corrugated polypropylene, and can be folded into the V-shape when the prefabricated building is being assembled. The structural member reinforcement 108 may be made of other desired materials. As shown in FIG. 16, the structural member reinforcement 108 is inserted into the structural member 14h, and the fill material 110 is added on top of the structural member reinforcement 108. The illustrated fill material 110 is dirt taken from the site where the prefabricated building 10 is being assembled, although other desired materials may be used. The structural member 14h includes fill holes 112 that allow the fill material 110 to be added after the structural member 14f has been placed on the guide members 16.

Other optional inserts may be placed inside one or more of the structural members 14 in addition or alternatively to the structural member reinforcement 108. For example, fiberglass or other insulation material may be added in order to improve the sound or heat insulating properties of the wall 12. Or high-strength materials such as sheets of the synthetic fiber material Kevlar may be added in order to improve the ability of the wall 12 to prevent the passage of objects. This may be useful in locations where it is desirable that the prefabricated house 10 provide improved resistance to damage from hurricane-borne objects, for example.

Figure 17:
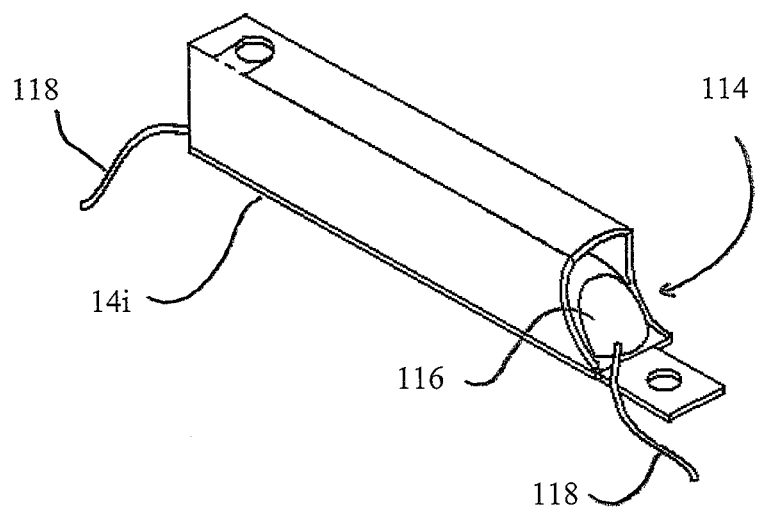
FIG. 17 is a perspective view, partially cut-away, of a structural member including a water reservoir, suitable for the assembly of the prefabricated structure shown in FIG. 1.

In reference to FIG. 17, an optional water reservoir is shown generally at 114. The water reservoir 214 includes a plastic water tank 116 located within the interior space 34 of the structural block 14i. The plastic water tank 116 may be inserted into the interior space 34 when the structural block 14i is assembled. The illustrated plastic water tank 116 is a rigid tank, although a flexible tank may be used. Further, the tank may be made out of a material other than plastic, if desired. The plastic water tank 116 includes two fluid channels 118. The one or more of the fluid channels 118 may be connected to the fluid channel on a similar plastic water tank in an adjacent structural block, in order to provide increased water storage capacity. The fluid channel 118 may also be connected to an inlet or an outlet (not shown). The inlet allows water to be added to the water reservoir 214 from an outside source, such as pumped ground water or collected rain water. The outlet allows water to be removed from the water reservoir 214 in order to be used. It should be appreciated that the inlet and the outlet may be the same component. The water can be removed from the reservoir for any desired use, including cooking, cleaning, or irrigation. By installing the water reservoir 214 in structural members 14 located near the top of the wall 12, water can be removed through the outlet at some pressure closer to the ground 52. It should be appreciated that the fluid storage capacity of the plastic water tank 116 depends on the size of the plastic water tanks 116, and that the total fluid capacity of the water reservoir 214 depends on the number of plastic water tanks 116 installed. Additionally, it should be appreciated that the water reservoir 214 may be adapted to hold fluids other than water, if desired.

It should be appreciated that the prefabricated house 10 may include an optional gutter (not shown) that collects precipitation run-off from the roof 20. Water collected in the gutter may be routed to a water storage tank (not shown), to the water reservoir 214, to a disposal point, or to other desired locations. As shown in FIG. 1, the prefabricated house 10 may include planter 120 that are hung on the wall 12 and allow desired flora to be planted. A drip irrigation system connected to the water reservoir 214 helps to provide water to the planter 120.

Figure 18:
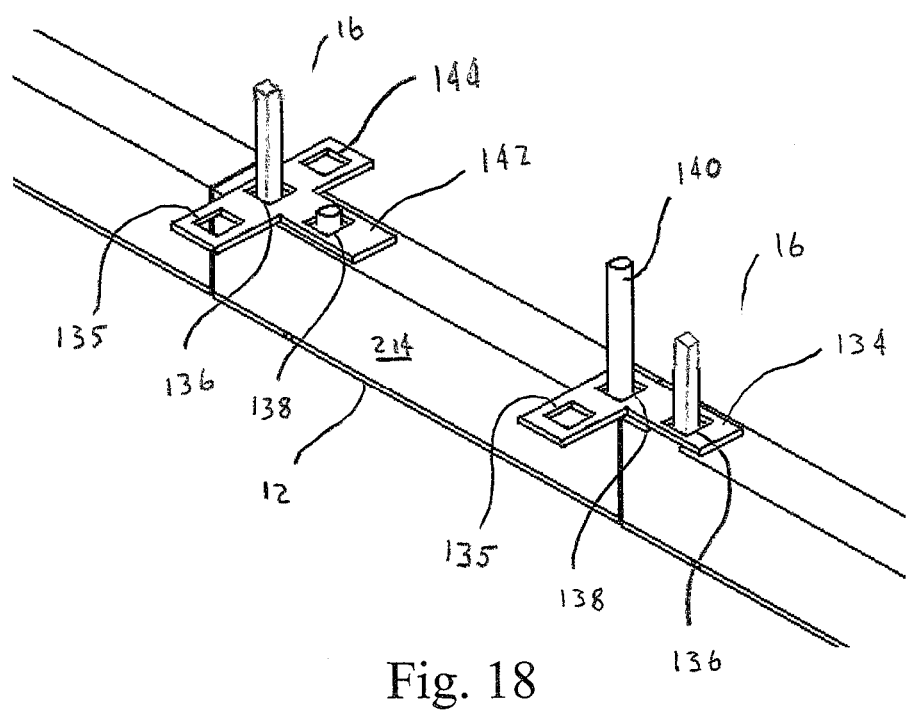
FIG. 18 is a perspective view of a portion of an alternative wall with fixture mounts attached.

Referring now to FIG. 18, a portion of the wall 12 with an optional fixture mount 134 is shown. The fixture mount 134 provides a fixture point 135 for attaching fixtures such as beds, tables, or sinks, or for attaching walls to the wall 12. The walls attached to the fixture mount 134 may be used to allow out-buildings to be fixed relative to the prefabricated building 10, and so that the occupant space 13 to be divided into multiple areas. The fixture mount 134 is an L-shaped piece of stamped metal, but it should be appreciated that the fixture mount may be made of other desired materials that are suitable to support the weight that the fixture will apply to it. The fixture mount 134 includes a mount guide hole 136, and the fixture mount 134 is aligned on the wall 12 so that one of the guide member 16 passes through the guide hole 136. The fixture mount 134 also includes a stabilizing hole 138, and a stabilizing member 140 is passed through the stabilizing hole 138 and an optional stabilizing hole (not visible) in the structural member 214. The stabilizing member serves to help prevent rotation of the fixture mount 134 relative to the wall 12. The illustrated stabilizing member is a one-inch diameter fiberglass pole. It should be appreciated that the stabilizing member may include other selected materials or mechanisms, including a protrusion on the structural member 214 that engages the stabilizing hole 138, bolts, screws, adhesives, or welding.

Also shown in FIG. 18 is a double fixture mount 142. The double fixture mount 142 has features in common with the fixture mount 134, and those features will not be described separately. The double fixture mount 142 includes a fixture point 135, and a second fixture point 144. The double fixture mount 142 is aligned on the wall 12 so that the fixture point 135 and the second fixture point 144 are located on opposite sides of the wall 12. This allows fixtures to be attached to both sides of the wall 12 at the same location. It should be appreciated that FIG. 18 illustrates only one layer of structural members 214 below the fixture mount 134, but the fixture mount 134 may be included at any level of the wall 12, and that additional layers of structural members 214 may be placed above the fixture mount 134.

Figure 19:
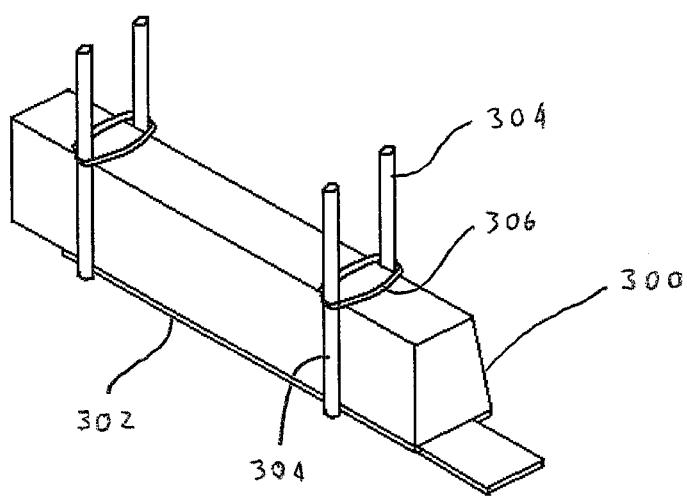
FIG. 19 is a perspective view of a portion of an alternative wall design.

Referring now to FIG. 19, a portion of an alternative wall 300 is shown. The alternative wall 300 is constructed using structural members 302. Structural members 302 are assembled from sheets, similarly to the structural members previously-described. However, guide members do not pass through the structural members 302. Instead, the structural member 302 is aligned so that it is cradled between guide members 304, and a collar 306 is used to pull the guide members together against the sides of the structural members 302.

Figure 20:
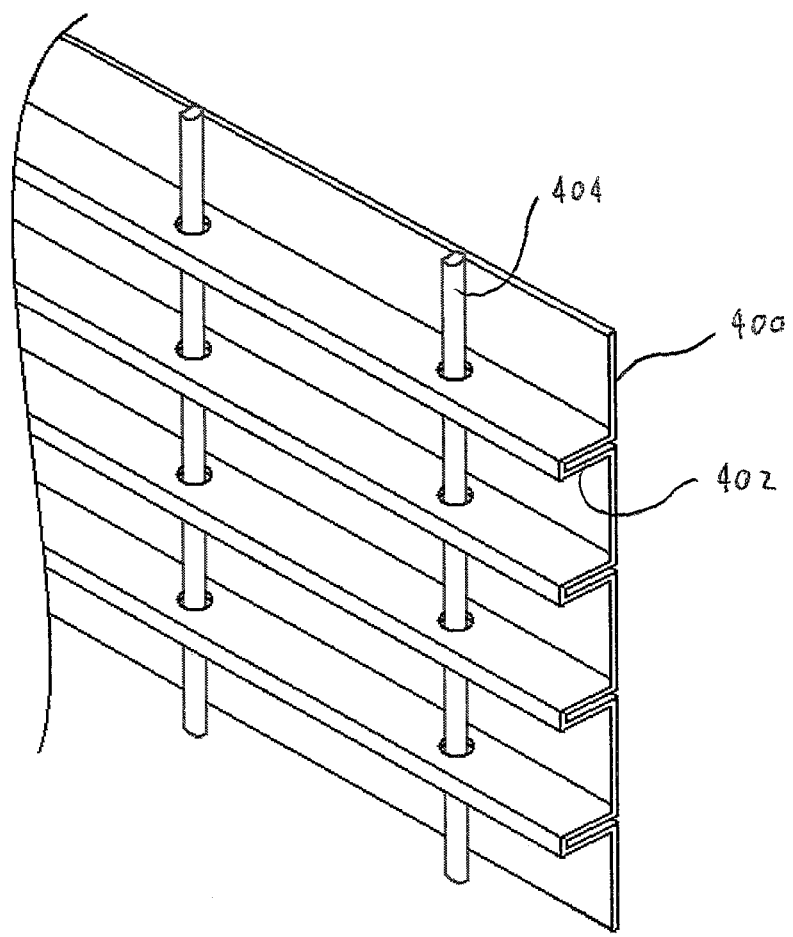
FIG. 20 is a perspective view of a portion of a second alternative wall design.

Referring to FIG. 20, a portion of a second alternative wall 400 is shown. The second alternative wall 400 is constructed of a piece of corrugated polypropylene. The second alternative wall 400 includes ribs 402 that engage with guide members 404.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A building comprising:
  a plurality of building blocks including a first building block and an adjacent building block arranged in an interconnected and stacked relationship to define a wall structure;
  the first building block including a first end surface, a second end surface, an inner surface extending between the first end surface and the second end surface, an outer surface extending between the first end surface and the second end surface, a first horizontal surface extending between the first end surface and the second end surface, a second horizontal surface extending between the first end surface and the second end surface, and a tab that is substantially coplanar with the second horizontal surface and extends from the second horizontal surface beyond the first end surface;
  the adjacent building block including an adjacent first end surface, an adjacent second end surface, an adjacent inner surface extending between the adjacent first end surface and the adjacent second end surface, an adjacent outer surface extending between the adjacent first end surface and the adjacent second end surface, an adjacent first horizontal surface extending between the adjacent first end surface and the adjacent second end surface, an adjacent second horizontal surface extending between the adjacent first end surface and the adjacent second end surface, and an adjacent tab that is substantially coplanar with the adjacent second horizontal surface and extends from the adjacent second horizontal surface beyond the adjacent first end surface; and
  a plurality of vertically extending guide members arranged in a horizontally spaced apart relationship corresponding to a desired wall structure;
  wherein the first end surface abuts the adjacent second end surface and the second horizontal surface is substantially coplanar with the adjacent second horizontal surface, wherein one of the guide members extends through a first vertically extending guide hole in the first building block, and another of the guide members extends through a second vertically extending guide hole in the first building block and through an adjacent vertically extending guide hole in the adjacent building block, and wherein the second vertically extending guide hole is located in the tab of the first building block.

2. The building as defined in claim 1 wherein a restraining member is mounted on an upper end of at least one vertically extending guide member.

3. The building as defined in claim 1 and further including a roof comprising:
  a pair of space apart gables supported above the ground by said wall structure, each defining a ridge support point;
  a ridge member extending generally horizontally between the ridge support points of the gables,
  a flexible roof panel, the flexible roof panel including a central section supported by said ridge member, the flexible roof panel extending in a downwardly sloped manner from each side of the ridge member and terminating in first and second lower edges; and
  a plurality of restraining members having upper ends connected to the lower first and second edges of the flexible roof panel, and having lower ends adapted to be secured relative to the ground.

4. The building defined in claim 3 wherein the roof panel includes first and second flexible roof panels, each panel including an upper generally horizontally extending edge coupled to the ridge member.

5. The building defined in claim 4 wherein at least one of the first and second lower edges, and the corresponding upper ends of the restraining members, are coupled to a load distribution beam.

6. The building of claim 1, the adjacent building block further including an adjacent indent between the adjacent second end surface and the adjacent second horizontal surface, and wherein the tab is located in the adjacent indent.

7. The building of claim 1, wherein each of the vertically extending guide members has a polygonal cross-sectional shape.

8. The building of claim 7, wherein each of the vertically extending guide holes has a polygonal cross-sectional shape.

9. The building of claim 1, wherein the first building block is constructed of a foldable sheet which, when folded to an assembled condition, defines a hollow block.

10. The building as defined in claim 9 and including a water reservoir located in said hollow block.

11. The building of claim 9, wherein the second horizontal surface and the tab are contiguous parts of the foldable sheet.

12. The building of claim 11, wherein each of the vertically extending guide members has a polygonal cross-sectional shape.

13. The building of claim 12, wherein each of the vertically extending guide holes has a polygonal cross-sectional shape.

\* \* \* \* \*